(12) United States Patent
Nakata et al.

(10) Patent No.: US 8,860,946 B2
(45) Date of Patent: Oct. 14, 2014

(54) POLARIZING DIFFERENT PHASES OF INTERFERED LIGHT USED IN A METHOD AND APPARATUS FOR MEASURING DISPLACEMENT OF A SPECIMEN

(75) Inventors: Toshihiko Nakata, Hiratsuka (JP); Masahiro Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 12/153,227

(22) Filed: May 15, 2008

(65) Prior Publication Data

US 2009/0073457 A1    Mar. 19, 2009

(30) Foreign Application Priority Data

May 15, 2007    (JP) .................................. 2007-128718

(51) Int. Cl.
*G01B 9/02*    (2006.01)

(52) U.S. Cl.
CPC ......... *G01B 9/02081* (2013.01); *G01B 9/02018* (2013.01); *G01B 2290/70* (2013.01); *G01B 2290/30* (2013.01)
USPC .......................................... 356/493; 356/510

(58) Field of Classification Search
CPC ........... G01B 9/02079; G01B 2290/45; G01B 9/02011; G01B 2290/70
USPC ....................... 356/493, 494, 510; 850/6, 1–3
See application file for complete search history.

(56) References Cited

U.S. PATENT DOCUMENTS

| | | | | |
|---|---|---|---|---|
| 4,261,107 A | * | 4/1981 | Coleman et al. ............... | 250/550 |
| 5,210,410 A | * | 5/1993 | Barrett ........................... | 250/234 |
| 5,656,769 A | * | 8/1997 | Nakano et al. ................. | 73/105 |
| 6,624,894 B2 | * | 9/2003 | Olszak et al. .................. | 356/511 |

(Continued)

FOREIGN PATENT DOCUMENTS

| | | |
|---|---|---|
| JP | 11-023216 | 1/1999 |
| JP | 2000-258124 | 9/2000 |

(Continued)

OTHER PUBLICATIONS

MIRAI project for Semiconductors Workshop for Lithography-Related Measurement Technology, Technology to Measure the Pattern Dimensions Using an AFM, Gonda et al, Oct. 19, 2004, pp. 27-33.

(Continued)

*Primary Examiner* — Hwa Lee
(74) *Attorney, Agent, or Firm* — Antonelli, Terry, Stout & Kraus, LLP.

(57) ABSTRACT

In measuring the displacement of an object using the phase-shifting light interference, since three beam splitters were used for generating the four phase-shifting optical paths, an interferometer was increased in size, whereby the application objects were limited. Also, to solve an essential problem that if there is a disturbance such as a temperature distribution, a humidity distribution, an air pressure distribution, a density distribution or an air flow change on the phase-shifting optical paths, a measurement error occurs, the four phase-shifting optical paths are produced spatially in parallel by combining a four division prism with a photonic crystal λ/4 element and a photonic crystal polarizing element arranged like an array, constructing a small light interference displacement sensor in the invention, whereby the application objects are expanded, and the microscopic displacement or surface roughness of the object can be measured at a resolution of sub nanometer or less and with high reproducibility without influence of the disturbance.

28 Claims, 12 Drawing Sheets

(56) References Cited

U.S. PATENT DOCUMENTS

| | | | |
|---|---|---|---|
| 6,657,181 B1 | 12/2003 | Ishizuka et al. | |
| 7,265,834 B2 | 9/2007 | Kawakami et al. | |
| 7,360,899 B2 * | 4/2008 | McGuire et al. | 353/20 |
| 2009/0210971 A1 | 8/2009 | Nakata et al. | |

FOREIGN PATENT DOCUMENTS

| | | |
|---|---|---|
| JP | 2002-039714 | 2/2002 |
| JP | 2007-017388 | 1/2007 |
| JP | 2007-046938 | 2/2007 |
| JP | 2007-51900 | 3/2007 |
| JP | 2007-085764 | 4/2007 |
| JP | 2007-86720 | 4/2007 |
| WO | WO 2004-008196 | 1/2004 |

OTHER PUBLICATIONS

Japanese Office Action issued Jul. 26, 2011.
Japanese Office Action dated Jul. 9, 2013 for Application No. 2012-089807.

* cited by examiner

POLARIZING DIFFERENT PHASES OF INTERFERED LIGHT USED IN A METHOD AND APPARATUS FOR MEASURING DISPLACEMENT OF A SPECIMEN

The present application claims priority from Japanese application serial No. JP2007-128718, filed on May 15, 2007, the content of which is hereby incorporated by reference into this application.

BACKGROUND OF THE INVENTION

1. Field of the Invention

The present invention relates to a method and its apparatus for measuring the displacement of an object using light interference, and more particularly to a method and its apparatus for measuring the displacement amount of an object from an interference signal obtained by applying a laser beam to the object and causing interference between the reflected light and a reference light.

2. Description of Related Art

A method for measuring the displacement amount or movement amount of an object using light interference is widely known. For example, in an AFM (Atomic Force Microscope) that is one kind of an SPM (Scanning Probe Microscope) known as a measuring tool of fine solid shape, a displacement sensor using light interference has been adopted as a displacement sensor for measuring the position of a probe with means capable of measuring the smaller displacement at high sensitivity, instead of the conventional capacitance sensor, as disclosed in semiconductor MIRAI project lithography related instrumentation technology workshop (Oct. 19, 2004) document, p. 28 (2004). In this light interference displacement sensor, a laser beam from a laser light source is divided into two, in which one of the beams is directed to a reference mirror, and the other is directed to a target mirror attached on a probe scanning mechanism to cause interference between both reflected lights (reference light and measuring light) with a phase difference of 0, $\pi/2$, $\pi$ and $3\pi/2$, and four generated phase-shifting interference lights are received and converted into electrical signals, thereby calculating the movement amount of the probe through a desired computation process for four phase-shifting interference signals.

However, in the above light interference displacement sensor, there was a problem that the overall optical system is larger and the light interference displacement sensor is increased in size to limit the application objects, because as a method for providing a phase difference of 0, $\pi/2$, $\pi$ and $3\pi/2$ between the reference light and the measuring light, it employs a prism for synthesizing the reference light and the measuring light, a non-polarizing beam splitter for splitting the synthesized light into two optical paths, and two polarizing beam splitters for giving a phase shift between the reference light and the measuring light that make up the synthesized light in two optical paths.

Therefore, it was nearly impossible that three light interference displacement sensors for x, y and z axes, which are larger than the conventional capacitance sensor, were mounted on the AFM applied to a mass production line such as a semiconductor manufacturing process. Further, it had an essential problem that there occurs an error in performing a computation process for calculating the movement amount of an object from the four phase-shifting interference signals, if there is a different disturbance such as a temperature distribution, a humidity distribution, an air pressure distribution, a density distribution or an air flow distribution on the four optical paths, because the optical paths for the four interference lights with a phase shift provided are separate away from each other.

SUMMARY OF THE INVENTION

The invention relates to a method and its apparatus for measuring the displacement, which can generate at least four phase-shifting interference lights without using a large optical system, and calculate the displacement amount or movement amount of an object at high precision without influence of disturbance.

That is, the invention provides an apparatus for measuring the displacement, comprising a light source, means for separating a light beam from the light source into a first light and a second light, irradiation means for applying the first light to a movable object, interference means for generating a plurality of interference lights by causing interference between the reflected light from the object and the second light with plural light phase differences on the same plane, and movement amount detection means for detecting the movement amount of the object from the plurality of interference lights.

Also, in the invention, the interference means for generating the plurality of interference lights by causing interference between the reflected light from the object and the second light with plural light phase differences on the same plane is a polarizing element array.

Also, in the invention, the polarizing element array is a photonic crystal array.

Also, in the invention, the means for separating the light beam from the light source into the first light and the second light is a wire-grid polarizing element.

Also, in the invention, the means for separating the light beam from the light source into the first light and the second light is a photonic crystal.

With the invention, it is possible to generate at least four phase shift interference lights with a very small light interference displacement sensor without using a large optical system, and calculate the displacement amount or movement amount of an object at high precision without influence of disturbance, whereby the application objects are greatly expanded. As a result, there is an effect that the probe scanning by the scanning probe microscope, most notably the AFM, can be made at a precision of sub nanometer or less, and the optical information or microscopic roughness information of the fine solid structure element, most notably the semiconductor device, can be measured at a resolution of sub nanometer or less and with high reproducibility. Also, there is an effect that the microscopic roughness distribution or microscopic roughness defect of sub nanometer or less on a semiconductor wafer, magnetic disk or magnetic head air-bearing surface can be inspected.

These and other objects, features and advantages of the invention will be apparent from the following more particular description of preferred embodiments of the invention, as illustrated in the accompanying drawings.

DESCRIPTION OF THE PREFERRED EMBODIMENTS

A photonic crystal that can control polarization and the transmitting or reflecting characteristic of an incident light with a sub-wavelength microstructure has gained attention in recent years. The present invention is aimed at generating a phase-shifting interference light using this photonic crystal and calculating the displacement amount or movement amount of an object at high precision without influence of disturbance.

The embodiments of the invention will be described below with reference to the drawings.

Embodiment 1

Figure 1:
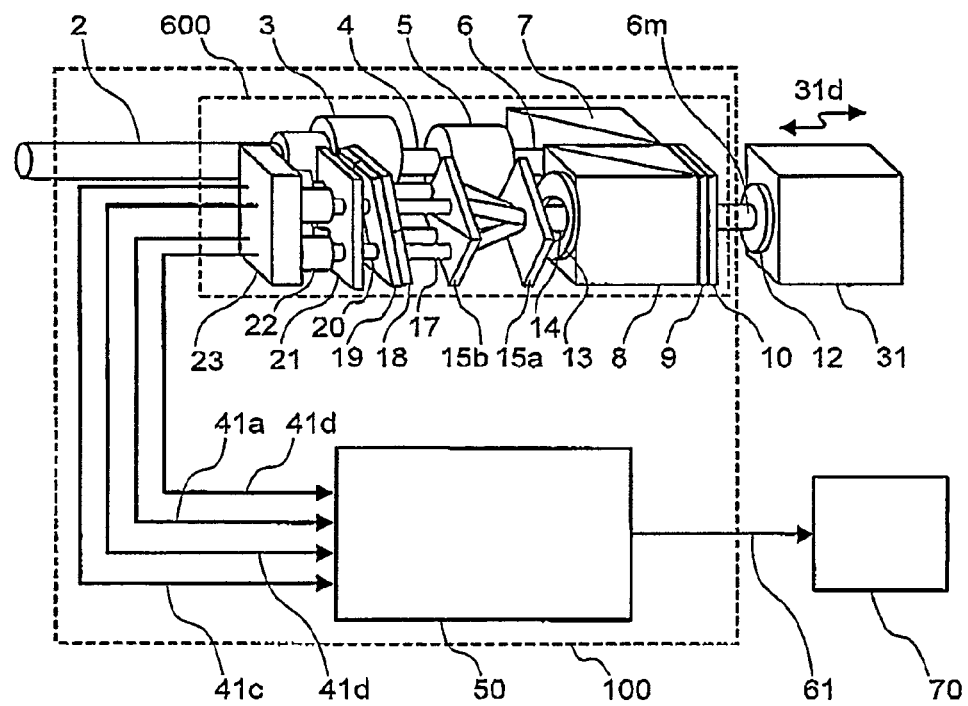
FIG. 1 is a perspective view and a block diagram showing the constitution of a light interference displacement sensor according to an embodiment 1.

Referring to FIGS. 1 to 4, a first embodiment of the invention will be described below. As shown in FIG. 1, a light interference displacement sensor of this embodiment comprises a light source unit, not shown, a sensor unit 100 and a displacement output unit 70.

In the light source unit, a laser beam of linearly polarized light having a wave length of 632.8 nm from a frequency stabilized He—Ne laser, for example, is conducted to the sensor unit 100 in a polarization direction of 45° by a polarization maintaining fiber 2.

Figure 2:
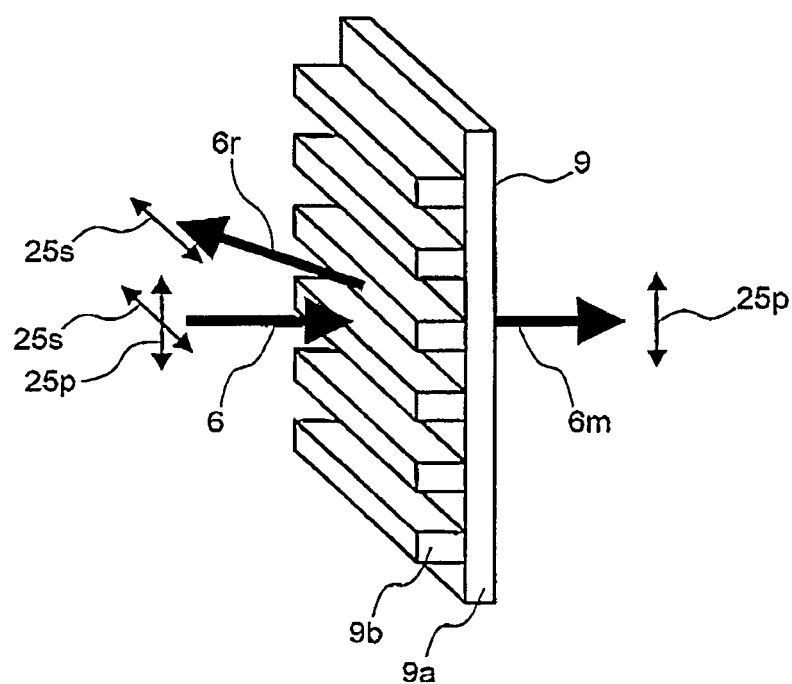
FIG. 2 is a perspective view showing the constitution and function of a reference mirror using a wire-grid polarizing element.

The sensor unit 100 comprises an interferometer 600 and a displacement computation processing unit 50. In the interferometer 600, a polarized light of 45° emitted from the polarization maintaining fiber 2 is converted into the parallel light 4 by a collimator 3 and transmitted through a polarizing element 5 such as Glan-Thompson prism, and the transmitted light 6 is reflected from a prism mirror 7 and a non-polarizing beam splitter 8 to be incident on a reference mirror 9. The reference mirror 9 is formed with a grating 9b of metal material such as Al or the like on a synthetic quartz substrate 9a, as shown in FIG. 2. The polarized beam 6 incidents on this grating in the direction of 45° is composed of two orthogonal polarization components decomposed into vectors, in which an S polarization component 25s parallel to the longitudinal direction of the grating is reflected from the grating, and an orthogonal P polarization component 25p is transmitted through the grating. That is, this grating has the properties as a so-called wire-grid polarizing element (Wire Grid Polarizer). In this embodiment, the pitch of the grating 9b is 144 nm, the line width is 65 nm, and the height is 165 nm.

An S polarized beam 6r reflected from the reference mirror 9 is used as a reference beam. The transmitted P polarized beam 6m is used as a measuring beam. The P polarized beam 6m is transmitted through a quarter wavelength plate 10 to become the circularly polarized light, reflected from a target mirror 12 laid on a measurement object 31, transmitted through the quarter wavelength plate 10 again to become the S polarized light, reflected from the reference mirror 9, transmitted through the quarter wavelength plate 10, reflected as the circularly polarized light from the target mirror 12, transmitted through the quarter wavelength plate 10 to become the P polarized light, and transmitted through the reference mirror 9. That is, the measuring beam 6m reciprocates twice on an optical path between the reference mirror 9 and the target mirror 12, whereby double the movement amount 31d of the measurement object 31 is detected. The S polarized beam 6r reflected from the reference mirror 9 and the P polarized beam 6m transmitted through the reference mirror are synthesized as an orthogonal polarized beam 14, which is transmitted through the non-polarizing beam splitter 8.

This orthogonal polarized beam 14 passes through an aperture 13 for removing stray light, and divided into four orthogonal polarized beams 17 by two opposed quadrangular pyramid prisms 15a and 15b having a pyramidal shape. A beam dividing method is not limited to such prisms, but may be applied to the diffraction optical element. The four orthogonal polarized beams 17 are transmitted through the phase shift elements 18 and 19 to make polarization interference with a phase shift of 0, $\pi/2$, $\pi$ and $3\pi/2$ given between the orthogonal polarization components, generating the four phase shift interference lights 20.

Figure 3:
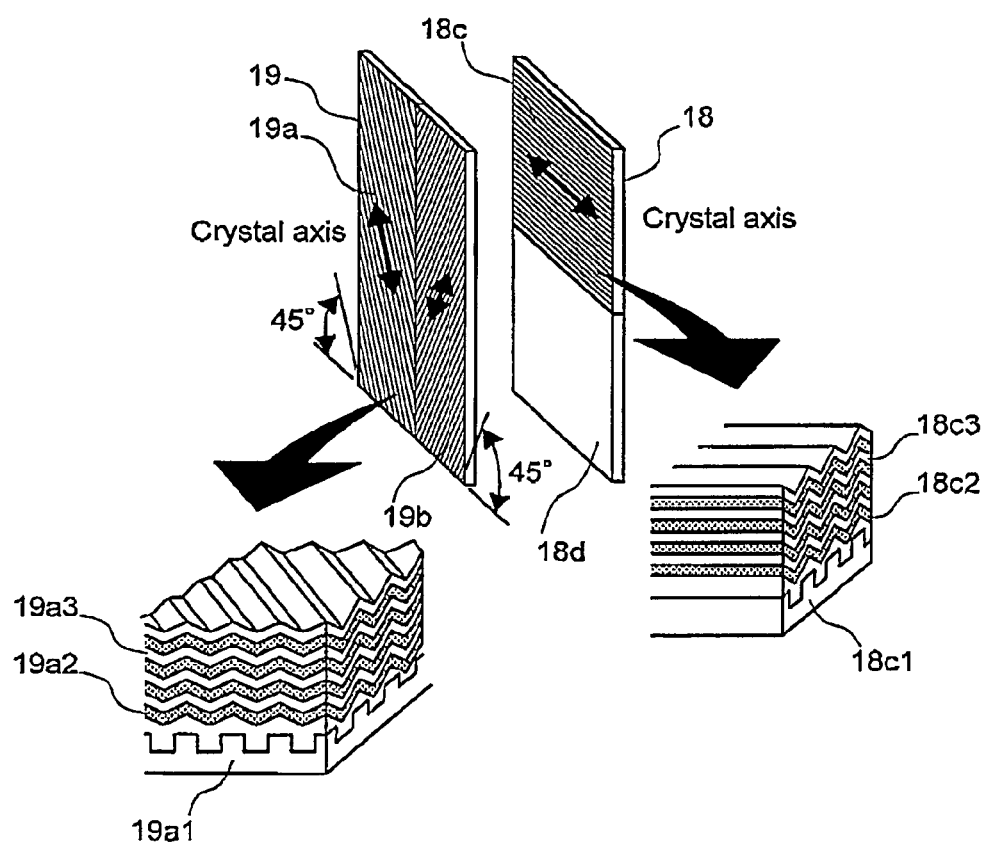
FIG. 3 is a perspective view showing the constitution of a phase shift element using a photonic crystal according to the embodiment 1.

The phase shift element 18 is divided into two, in which the lower half is composed of a synthetic quartz 18d and the upper half is composed of a photonic crystal 18c, as shown in FIG. 3. The photonic crystal 18c is constituted by forming a grating like lines and spaces in the horizontal direction with a smaller pitch than the wavelength of incident light on the synthetic quartz substrate 18c1, and laminating the dielectric thin films 18c2 and 18c3 having different refractive indexes thereon, as shown in an enlarged view. The cross section of thin films deposited on the grating is kept in the surface profile like a triangular waveform in a film thickness direction owing to the surface profile of the grating. The thin film materials include Si, $SiO_2$, $TiO_2$, $Ta_2O_5$, and $Nb_2O_5$. Such a multilayer thin film structure with the grating as a base is the photonic crystal with a crystal orientation in the direction of grating, showing a birefringence characteristic owing to Bragg reflection and interference between the multilayer thin films, and can control the polarization or transmitting/reflecting characteristics of incident light (refer to: Photonic Lattice Corp. product catalogue).

The grating pitch, depth and film thickness of each thin film are controlled in consideration of the wavelength of incident light and the desired characteristics. Also, it is a great feature that the polarizing elements or wavelength elements having different crystal orientations can be formed like an array on one substrate, using a photolithography technique or a film formation technique such as sputtering for use in the semiconductor device manufacturing. The photonic crystal 18c has a function as the quarter wavelength plate, in which the bold arrow indicates the crystal orientation. That is, there occurs a phase difference of $\pi/2$ between two polarization components for two orthogonal polarized beams transmitted through the photonic crystal 18c among the four orthogonal polarized beams 17, as shown in FIG. 1. On the other hand, remaining two orthogonal polarized beams are transmitted through the synthetic quartz 18d to produce no phase difference.

The phase shift element 19 is divided into two, in which the left half is composed of a photonic crystal 19a having a crystal orientation of 45° and the right half is composed of a photonic crystal 19b having a reverse crystal orientation of 45°, as shown in FIG. 3. The photonic crystal 19a, like the photonic crystal 18c, is constituted by forming a grating like lines and spaces in the 45° direction with a smaller pitch than the wavelength of incident light on the synthetic quartz substrate 19a1, and laminating the dielectric thin films 19a2 and 19a3 having different refractive indexes thereon, as shown in an enlarged view. The photonic crystal 19b has also the same structure. The photonic crystals 19a and 19b have a function as the polarizing element, in which the bold arrow indicates the crystal orientation. That is, interference of both the polarization components is caused with a phase shift of $\pi$ relatively given between two polarization components making up two orthogonal polarized beams transmitted through the photonic crystal 19a and two polarization components making up two orthogonal polarized beams transmitted through the photonic crystal 19b among the four orthogonal polarized beams 17, as shown in FIG. 1.

That is, the four phase shift interference lights 20 are generated by causing polarization interference with a phase shift of 0, $\pi/2$, $\pi$ and $3\pi/2$ given between the orthogonal polarization components of the four orthogonal polarized beams 17 transmitted through the phase shift elements 18 and 19. The four phase-shifting interference lights 20 are transmitted through an interference filter 21 having a transmission center wavelength at a wavelength of 632.8 nm to avoid influence of the disturbance light, received by the four photoelectric conversion elements 22 such as photodiodes, amplified by an amplifier 23, and outputted as the four phase shift interference signals 41a, 41b, 41c and 41d.

The four phase shift interference signals 41a, 41b, 41c and 41d are given by (expression 1) to (expression 4).

$$I_a = I_m + I_r + 2(I_m \cdot I_r)^{1/2} \cos(8\pi n D/\lambda) \quad \text{(expression 1)}$$

$$I_b = I_m + I_r + 2(I_m \cdot I_r)^{1/2} \cos(8\pi n D/\lambda + \pi) = I_m + I_r - 2(I_m \cdot I_r)^{1/2} \cos(8\pi n D/\lambda) \quad \text{(expression 2)}$$

$$I_c = I_m + I_r + 2(I_m \cdot I_r)^{1/2} \cos(8\pi n D/\lambda + \pi/2) = I_m + I_r - 2(I_m \cdot I_r)^{1/2} \sin(8\pi n D/\lambda) \quad \text{(expression 3)}$$

$$I_d = I_m + I_r + 2(I_m \cdot I_r)^{1/2} \cos(8\pi n D/\lambda + 3\pi/2) = I_m + I_r - 2(I_m \cdot I_r)^{1/2} \sin(8\pi n D/\lambda) \quad \text{(expression 4)}$$

Where $I_m$ denotes the detection intensity of the probe light, $I_r$ denotes the detection intensity of the reference light, n is the refractive index of the air, D is the movement amount 31d of the measurement object 31 and $\lambda$ is the wavelength of the laser beam 4.

The displacement computation processing unit 50 computes the movement amount D of the measurement object 31 based on (expression 5), in which the movement amount D is displayed as a movement amount signal 61 on a displacement output unit 70.

$$D = (\lambda/8\pi n)\tan^{-1}\{(I_c - I_d)/(I_a - I_b)\} \quad \text{(expression 5)}$$

Figure 4:
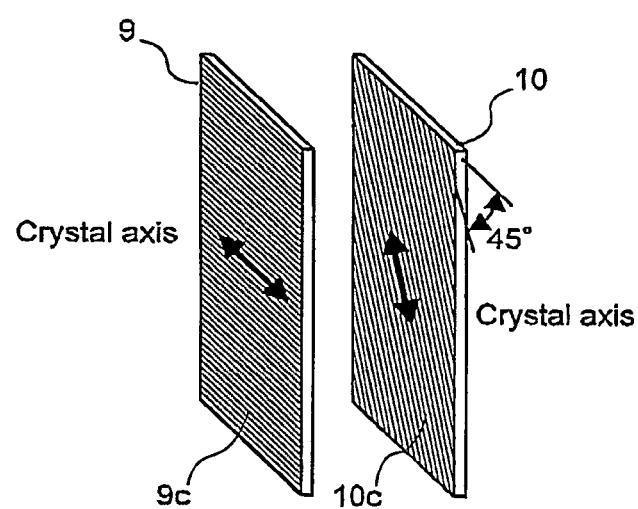
FIG. 4 is a perspective view showing the constitution of a reference mirror using the photonic crystal and a quarter wavelength plate.

Though the wire-grid polarizing element (Wire Grid Polarizer) is used as the reference mirror 9 in this embodiment, it will be apparent from the previous description that a photonic crystal 9c having the crystal orientation in the horizontal direction may be used, as shown in FIG. 4. Likewise, a photonic crystal 10c having the crystal orientation in the direction of 45° may be used as the quarter wavelength plate 10. To further simplify the interferometer 600, the phase shift element 19 may be composed of the photonic crystal 19a alone, producing the phase shift interference signals 41a and 41c represented by (expression 1) and (expression 3), and obtaining the movement amount D of the measurement object 31 from the two interference signals, as shown in FIG. 3.

As will be clear from FIG. 1, two beams of the measuring beam 6m going toward the target mirror 12 and the reference beam 6r are emitted from the light source unit and enter the sensor unit 100 to pass through exactly the same optical path up to the reference mirror 9, and further from the reference mirror 9 to the four photoelectric conversion elements 22 where they are received. That is, the interferometer is of a common optical path type. Accordingly, even if there occurs a temperature distribution, a refractive index distribution or a mechanical vibration due to fluctuation of the air on the optical path, these disturbances have the same influence on both beams, whereby when both beams interfere, the influences of the disturbances are offset, so that the interference light is not affected by the disturbance.

Though the measuring beams 6m only exists on the optical path between the reference mirror 9 and the target mirror 12, a gap between the reference mirror 9 and the target mirror 12 can be set to 1 mm or less, because the stroke of a scanning probe microscope is at most about several hundreds of microns, for example, whereby the influence of the disturbance in this minute gap can be ignored. Also, the strength variation of the laser beam itself brings about variations in the probe light detection intensity $I_m$ and the reference light detection intensity $I_r$ in (expression 1) to (expression 4), but is offset through a subtraction process and a division process of (expression 5) in the displacement computation processing unit 50.

Further, the light interference displacement sensor of this embodiment has a simple constitution of generating the four orthogonal polarized beams and generating and receiving the four phase-shifting interference lights spatially in parallel through the phase-shifting elements arranged like an array, whereby there is a merit that the number of optical components is significantly smaller and the displacement sensor has a much smaller size than the conventional phase-shifting interferometer. Specifically, the size of the interferometer 600 can be reduced to about 20×15×50 mm or less. Also, since the four phase-shifting interference lights pass through the proximate optical paths, even if there is a disturbance such as a temperature distribution, a humidity distribution, an air pressure distribution, a density distribution, or an air flowing distribution due to fluctuation of the air on the optical path, the influence can be suppressed to the minimum.

From the above, with the light interference displacement sensor of this embodiment, the movement amount or position of the measurement object can be measured stably at a precision from sub nanometer to pico-meter or less without controlling the environmental factors such as temperature, humidity, air pressure, density and acoustic vibration at high precision.

Embodiment 2

Figure 5:
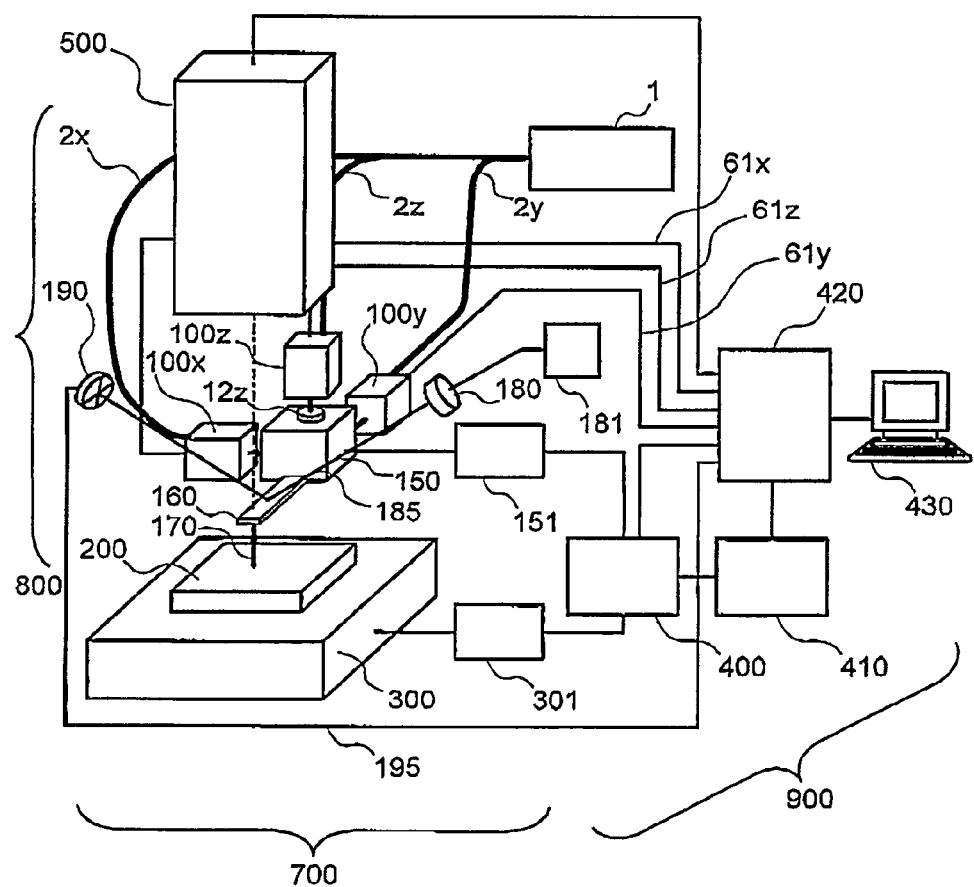
FIG. 5 is a perspective view and a block diagram showing the schematic constitution of an AFM according to an embodiment 2.
Figure 6:
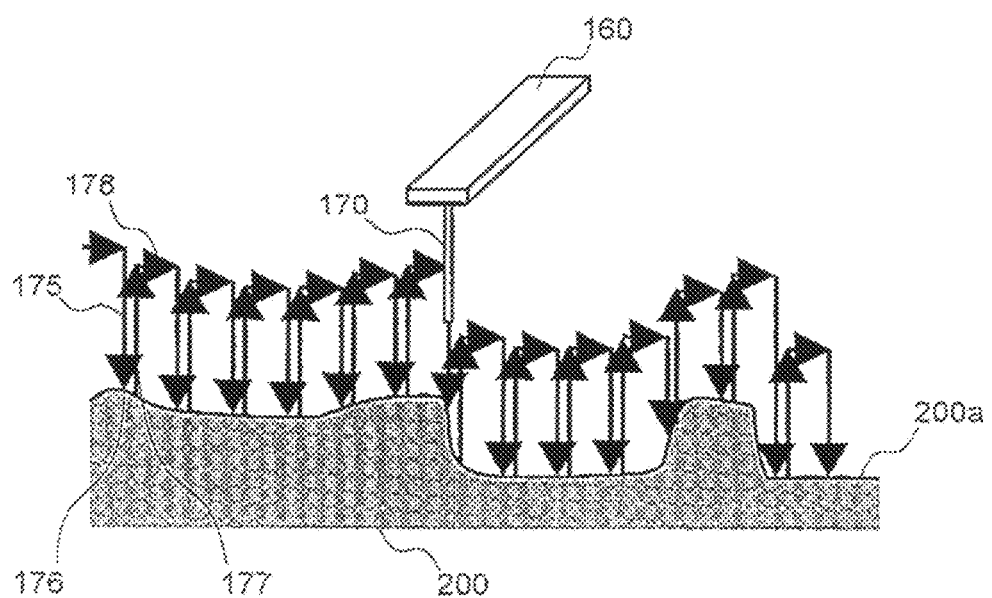
FIG. 6 is a perspective view of a specimen cross section and a cantilever showing the step-in scanning of a probe for the AFM according to the embodiment 2.
Figure 7:
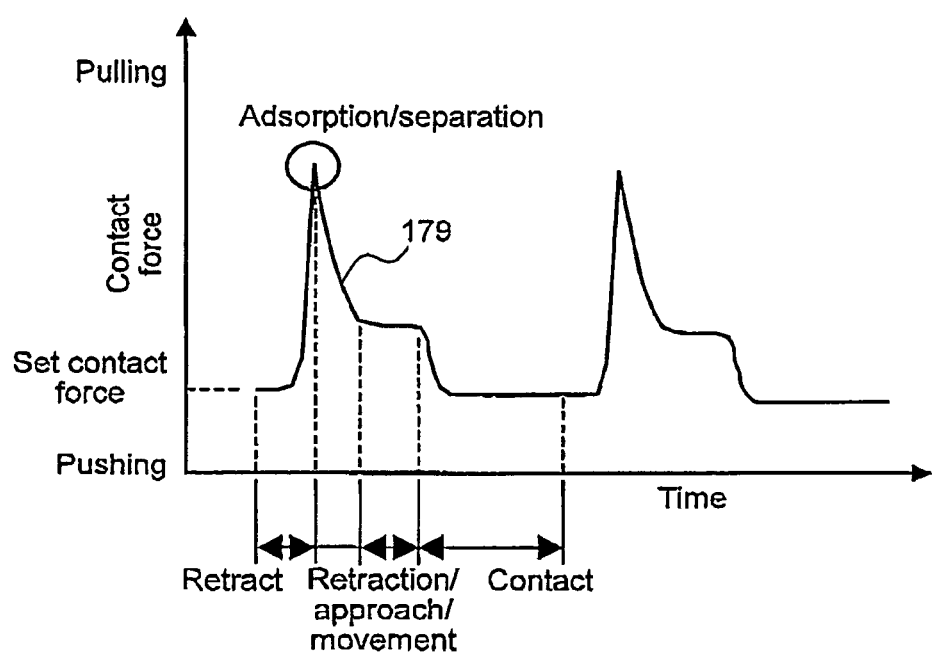
FIG. 7 is a graph showing the relationship between the step-in scanning and a probe-specimen contact force according to the embodiment 2.

Referring to FIGS. 5 to 7, a second embodiment of the invention will be described below. As shown in FIG. 5, in this embodiment, the light interference displacement sensor of the first embodiment is mounted on an AFM. The AFM of this embodiment comprises a stage unit 700 that can move in the three dimensional directions of X, Y and Z with a specimen laid thereon, an AFM unit 800 for measuring the surface of the specimen by scanning the probe, a signal processing and control unit 900 for generating an AFM image from measurement data and controlling the overall system, and a monitor optical system unit 500 for observing and positioning a measured part on the specimen.

The stage unit 700 comprises an XYZ stage 300 that can move in the three dimensional directions of X, Y and Z with the specimen 200 laid thereon, and a driver 301. The specimen 200 is laid on the XYZ stage 300, and positioned at a desired measuring position, while observing the surface of the specimen 200 on the monitor optical system unit 500, driven by the driver 301.

The AFM unit 800 comprises a cantilever 160 with a probe 170 formed of HDC (High Density Carbon) or the like fixed at the tip end portion, an XYZ piezoelectric element actuator 150, a driver 151, x, y and z axis sensor units 100$x$, 100$y$ and 100$z$ for measuring the position (position of the XYZ piezoelectric element actuator 150) of the probe 170, a light source unit 1, the polarization plane conservation fibers 2$x$, 2$y$ and 2$z$ for conducting the laser beam of linearly polarized light from the light source unit 1 to the light interference displacement sensors, a semiconductor laser 180 for radiating a laser beam 185 (wavelength 405 nm) on the back face of the cantilever 160, a four division position sensor 190 for detecting the reflected light from the cantilever 160, and a drive circuit 181 for controlling the semiconductor laser 180. The target mirrors 12$x$ (not shown), 12$y$ (not shown) and 12$z$ for the light interference displacement sensor are attached on the surface of the XYZ piezoelectric element actuator 150.

The monitor optical system unit 500 comprises an image forming lens and an image pickup camera, whereby the specimen 200 is positioned at a desired measuring position under the probe 170 by driving the XYZ stage 300 with the specimen 200 laid thereon using the driver 301 while observing an optical image of the surface of the specimen 200 with the image pickup camera.

In an image forming unit 410 for the signal processing and control unit 900, the position measurement signals 61$x$, 61$y$ and 61$z$ of the XYZ piezoelectric element actuator 150 are processed based on an output signal 195 from the four division position sensor 190 to generate an AFM image. The AFM image generated by the image forming unit 410 is sent to an overall control unit 420 and displayed on an output screen of an output unit 430 such as a display.

Next, a method for measuring the AFM image using an optical lever principle will be described below. The AFM image is obtained from the movement amount of the probe 170 (the movement amount of the XYZ piezoelectric element actuator 150) by scanning the probe 170 over the specimen 200 with a contact force between the probe 170 and the specimen 200 kept constant. At first, a way of obtaining the contact force between the probe 170 and the specimen 200 will be described below.

A laser beam (wavelength 405 nm) 185 from the semiconductor laser 180 driven by a drive circuit 181 is applied on the back face of the cantilever 160 with the probe 170 fixed at the tip end portion, and the reflected light is received by the four division position sensor 190. The cantilever 160 is made to descend to make the probe 170 fixed at the tip end portion contact with the specimen 200 by driving the XYZ piezoelectric element actuator 150 with the driver 151. If the cantilever 160 is made to further descend in this state, the inclination of the cantilever 160 is changed to change the reflecting direction of the laser applied on the back face of the cantilever 160, change the incident position of the laser beat on the four division position sensor 190, and change an output signal 195 from the four division position sensor 190. The contact force can be obtained by comparing this changed signal with data of the contact force which was prepared in advance based on the relationship between the output signal from the four division position sensor 190 and the inclination of the cantilever 160.

Next, a procedure for measuring the surface of the specimen will be described below. First of all, a measuring area of the specimen 200 is positioned under the probe 170 attached at the tip end portion of the cantilever 160 by driving the XYZ stage 300. Next, the cantilever 160 is made to descend in the measuring area of the specimen 200 by the XYZ piezoelectric element actuator 150 (Z direction scanning 175) while monitoring a contact state (contact force) between the probe 170 and the specimen surface 200$a$ with the output signal from the four division position sensor 190, in which the descent is stopped when a predetermined set contact force is reached, as shown in FIG. 6.

After the position of the probe 170 (position of the XYZ piezoelectric element actuator 150) is measured at a descent point 176 by the light interference displacement sensors 100$x$, 100$y$ and 100$z$, the cantilever 160 is made to ascend (Z direction scanning 177). If the probe 170 is completely separated from the specimen 200 based on an output signal from the four divisions position sensor 190, it is judged whether the measurement of the measuring area is ended. If the measurement is not ended, the cantilever 160 is moved to the next measuring point by driving the XYZ piezoelectric element actuator 150 (X scanning 178). The movement amount (feed pitch) in the X scanning is decided according to the resolution required for observation. At the next measuring point, the cantilever 160 is made to descend again, to measure the position of the probe 170.

After the step-in operation is repeatedly performed over the two-dimensional measuring area (XY area) using the XYZ piezoelectric element actuator 150, the measurement is finished. Herein, the above method for measuring the two-dimensional measuring area is made in the same way as the raster scan in the television. The feed pitch (adjacent scanning intervals) in the Y direction at this time is decided according to the resolution required for observation.

The XYZ direction scanning of the XYZ piezoelectric element actuator 150 driven by the driver 151 and the positioning of the specimen 200 with the XYZ stage 300 are generally controlled by the scanning control unit 400 in the signal processing and control unit 900. Also, the contact force between the probe 170 and the specimen 200 and the measurement of the position of the probe 170 (position of the XYZ piezoelectric element actuator 150) with the light interference displacement sensors 100$x$, 100$y$ and 100$z$ are generally controlled by an overall control unit 420 in the signal processing and control unit 900. An XYZ scan signal of the XYZ piezoelectric element actuator 150 from the scanning control unit 400, and a position measurement signal of the probe 170 from the overall control unit 420 are sent to the image forming unit 410, to generate a two-dimensional AFM image, which is then outputted via the overall control unit 420 to the output unit 430 such as a display.

FIG. 7 shows the relationship between the step-in scanning and the probe-specimen contact force. In a contact force variation curve 179, as the probe 170 ascends to retract from the specimen 200, the contact force transfers from a pressing direction to a pulling direction, in which the pulling force is maximized at the moment the probe is separated from the specimen. After separation, the probe is not subjected to contact force at all while moving to the next measuring point to approach the specimen again. The probe 170 starts to approach again, and at the moment it contacts the specimen 200 a force in the pushing direction is applied. When a set contact force is reached, the descent of the cantilever 160 is stopped. The set contact force is 1 nN or less, and preferably, from sub nN to pN. The detection of the contact force is not limited to the optical lever method, but may be made from a change in the vibration amplitude or vibration frequency by minutely vibrating the cantilever in the Z direction at an amplitude in the order of sub nanometer or a frequency in the order of MHz using the piezoelectric element actuator provided separately.

Also, the invention is not limited to the step-in scanning AFM, but may be applied to the tapping scan or other measurements of the probe position in the AFM. Also, the invention is not limited to the AFM, but may be applied to the position measurement and control of the probe in the other scanning probe microscopes, for example, SNOM (Scanning Near-Field Optical Microscope) or STM (Scanning Tunneling Microscope).

With this embodiment, the position of the probe can be measured with the small light interference displacement sensor of the first embodiment mounted on the AFM, as shown in FIG. 5, whereby the same effects of the first embodiment can be obtained. The position of the probe can be measured stably at a precision from sub nanometer to pico-meter or less. As a result, the resolution of the two-dimensional AM image can be increased, and the image reproducibility can be greatly improved.

Embodiment 3

Figure 8:
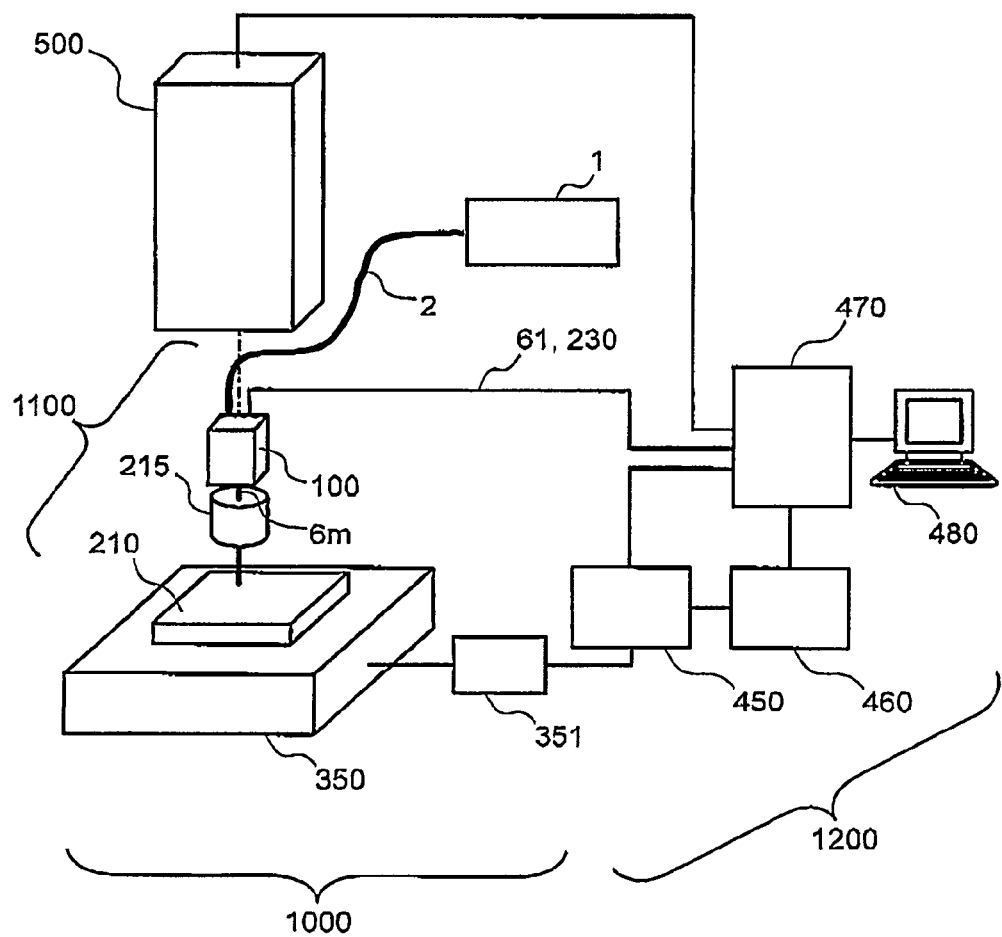
FIG. 8 is a perspective view and a block diagram showing the schematic constitution of a surface roughness defect inspection device according to an embodiment 3.

Referring to FIG. 8, a third embodiment of the invention will be described below. As shown in FIG. 8, in this embodiment, the light interference displacement sensor of the first embodiment is mounted on a surface roughness defect inspection device. The surface roughness defect inspection device of this embodiment comprises a stage unit 1000 that can scan in the three dimensional directions of X, Y and Z with a specimen laid thereon, a surface inspection unit 1100 for inspecting the surface of the specimen by relatively scanning the probe, a signal processing and control unit 1200 for generating a defect detection image from measurement data and controlling the overall system, and a monitor optical system unit 500 for observing and positioning a measured part on the specimen.

The stage unit 1000 comprises an XYZ stage 350 that can scan in the three dimensional directions of X, Y and Z with a specimen 210 laid, and a driver 351. The specimen 210 is laid on the XYZ stage 350, positioned at a desired inspecting position while observing the surface of the specimen 210 with the monitor optical system unit 500 driven by the driver 351, and scanned in the XY direction for inspection of the surface roughness.

The surface inspection unit 1100 comprises the light interference displacement sensor 100 for inspecting a rough state on the surface of the specimen 210, a converging lens 215, a light source unit 1, and a polarization maintaining fiber 2 for conducting the laser beam of linearly polarized light from the light source unit 1 to the light interference displacement sensor 100. The light source unit may be a solid-state laser having a wavelength of 532 nm, for example. The constitution and function of the light interference displacement sensor 100 are the same as the first embodiment, and the explanation is omitted. A measuring beam $6m$ outgoing from the light interference displacement sensor 100 is converged on the surface of the specimen 210 by the converging lens 215. If the NA (Numerical Aperture) of the converging lens 215 is 0.8, the converged spot diameter is about 0.8 μm. To maintain this spot diameter during XY scanning of the specimen 210, an automatic focusing unit, not shown, may be provided, as needed.

The monitor optical system unit 500 comprises an image forming lens and an image pickup camera, whereby the specimen 210 is positioned at a desired inspecting position under the converging lens 215 as pre-stored by driving the XYZ stage 350 with the specimen 210 laid thereon using the driver 351 while observing an optical image on the surface of the specimen 210 through the image pickup camera.

In a defect detection unit 460 for the signal processing and control unit 1200, a surface roughness image is generated based on the measurement signals 61, 230 of the light interference displacement sensor 100 and an XYZ drive signal of the XYZ stage 350. Further, in the defect detection unit 460, a defect having the roughness more than or equal to a preset height is detected, sent together with the surface roughness image to the overall control unit 470, and displayed on the output screen of the output unit 480 such as a display.

Next, a procedure for inspecting a rough state on the surface of the specimen 210 will be described below. First of all, the surface inspecting unit 1100 is retracted from an optical axis of the monitor optical system unit 500, and an inspecting area of the specimen 210 is positioned under the converging lens 215 as pre-stored by driving the XYZ stage 350. Next, after the surface inspecting unit 1100 is moved onto the optical axis of the monitor optical system unit 500, the XYZ stage 350 is driven in the XY direction to scan the specimen 210 in the same way as the raster scan in the television (continuous scanning in the X direction), as shown in FIG. 8. The feed pitch (adjacent scanning intervals) in the Y direction at this time is decided according to the resolution required for inspection. A surface roughness amount D of the specimen 210 at each scan position is calculated based on (expression 5), and outputted as the roughness measurement signal 61, 230, whereby the surface roughness image for the inspection area can be generated from the XY scan signal of the XYZ stage 350 and the measurement signal 61, 230.

The XY scanning for positioning and inspecting the specimen 210 with the XYZ stage 350 is generally controlled by a scanning control unit 450 for the signal processing and control unit 1200. Also, the overall control unit 470 in the signal processing and control unit 1200 controls the light interference displacement sensor 100 to inspect the surface of the specimen 210. An XY scan signal of the XYZ stage 350 from the scanning control unit 450, and the measurement signals 61, 230 of the light interference displacement sensor 100 from the overall control unit 470 are sent to the defect detection unit 460, to generate the surface roughness image, and a defect having roughness greater than or equal to the preset height is extracted and outputted via the overall control unit 470 to the output unit 480 such as a display.

With this embodiment, the roughness defect on the surface of the specimen can be inspected using the small light interference displacement sensor of the first embodiment, as shown in FIG. 8, whereby the same effects of the first embodiment can be obtained. The roughness defect on the surface of the specimen can be measured stably at a precision from sub nanometer to pico-meter or less. As a result, the sensitivity of the roughness defect inspection on a semiconductor wafer, magnetic disk or magnetic head air-bearing surface, for example, can be greatly improved.

Embodiment 4

Figure 9:
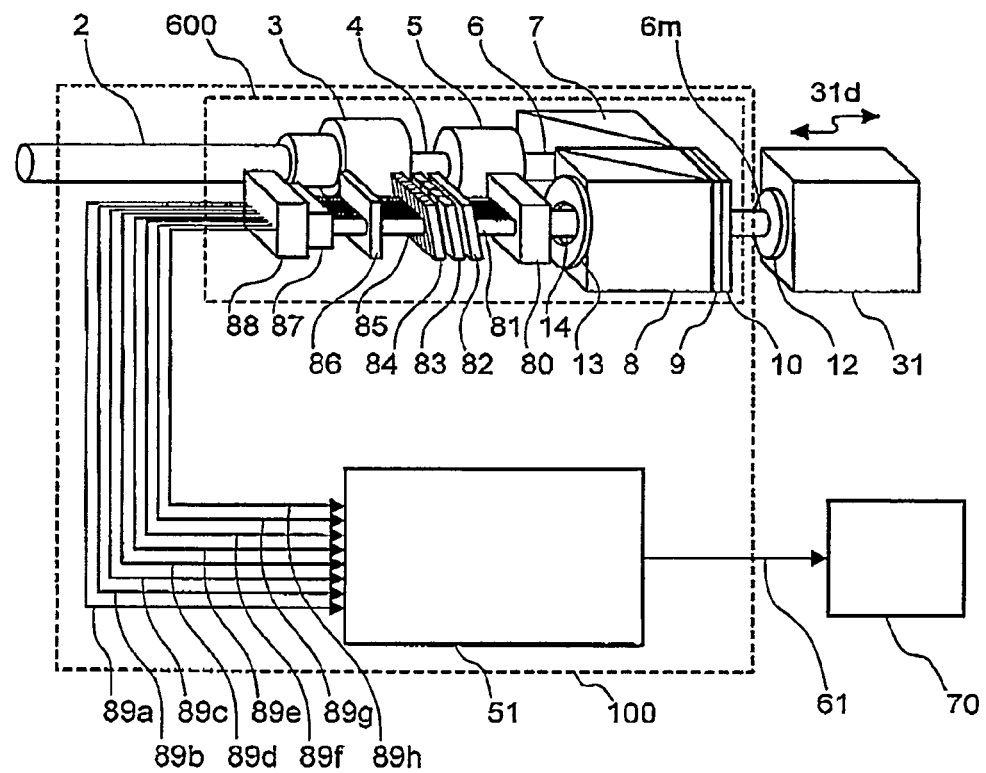
FIG. 9 is a perspective view and a block diagram showing the constitution of a light interference displacement sensor according to an embodiment 4.
Figure 10:
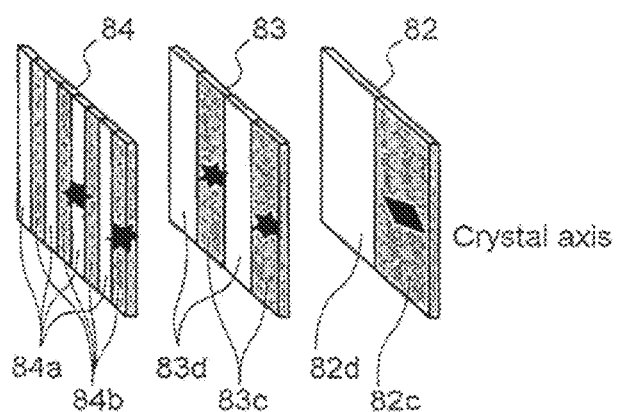
FIG. 10 is a perspective view showing the constitution of a phase-shifting element using the photonic crystal according to the embodiment 4.
Figure 11:
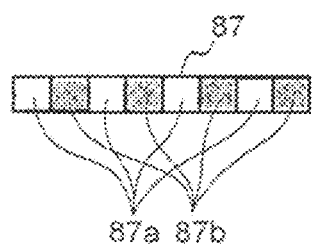
FIG. 11 is a front view showing a photoreceptive plane of a split type photoelectric conversion element according to the embodiment 4.

Referring to FIGS. 9 to 11, a fourth embodiment of the invention will be described below. As shown in FIG. 8, a light interference displacement sensor of this embodiment comprises a light source unit, not shown, a sensor unit 100 and a displacement output unit 70.

In the light source unit, a laser beam of linearly polarized light having a wavelength of 632.8 nm from a frequency stabilized He—Ne laser, for example, is conducted to the sensor unit 100 in a polarization direction of 45° by a polarization maintaining fiber 2.

The sensor unit 100 comprises an interferometer 600 and a displacement computation processing unit 51. In the interferometer 600, a polarized light of 45° emitted from the polarization plane conservation fiber 2 is converted into the parallel light 4 by a collimator 3, and transmitted through a polarizing element 5 such as Glan-Thompson prism, and the transmitted light 6 is reflected from a prism mirror 7 and a non-polarized beam splitter 8 to be incident on a reference mirror 9 in the same way as in the first embodiment. The reference mirror 9 is formed with a grating 9b of metal material such as Al or the like on a synthetic quartz substrate 9a, as shown in FIG. 2. The polarized beam 6 incident on this grating in a direction of 45° is composed of two orthogonal polarization components decomposed into vectors, an S polarization component 25s parallel to a longitudinal direction of the grating is reflected from the grating, and an orthogonal P polarization component 25p is transmitted through the grating. That is, this grating has the properties as a so-called diffraction polarization element (Wire Grid Polarizer). In this embodiment, the pitch of the grating 9b is 144 nm, the line width is 65 nm, and the height is 165 nm.

An S polarized beam 6r reflected from the reference mirror 9 is used as a reference beam. The transmitted P polarized beam 6m is used as a measuring beam. The P polarized beam 6m is transmitted through a quarter wavelength plate 10 to become the circularly polarized light, reflected from a target mirror 12 laid on a measurement object 31, transmitted through the quarter wavelength plate 10 again to become the S polarized light, reflected from the reference mirror 9, transmitted through the quarter wavelength plate 10, reflected as the circularly polarized light from the target mirror 12, transmitted through the quarter wavelength plate 10 to become the P polarized light, and transmitted through the reference mirror 9. That is, the measuring beam 6m reciprocates twice on an optical path between the reference mirror 9 and the target mirror 12, whereby double the movement amount 31d of the measurement object 31 is detected. The S polarized beam 6r reflected from the reference mirror 9 and the P polarized beam 6m transmitted through the reference mirror are synthesized as orthogonal polarized beams 14, and transmitted through a non-polarized beam splitter 8.

The orthogonal polarized beams 14 pass through an opening 13 for removing stray light, and converted into rectangular beams 81 by a beam shaping element 80 such as a diffraction optical element, a hologram element or an anamorphic prism pair. The rectangular orthogonal polarized beams 81 are transmitted through the phase shift elements 82, 83 and 84 to make polarization interference with a phase shift of 0, π/4, π/2, 3π/4, π, 5π/4, 3π/2 and 7π/4 given between the orthogonal polarization components and generate the eight phase shift interference lights 85.

A phase shift element 82 is divided into two, in which the left half is composed of a synthetic quartz 82d and the right half is composed of a photonic crystal 82c, as shown in FIG. 10. The constitution and principle of the photonic crystal 82c are the same as in the first embodiment, and the explanation is omitted. The photonic crystal 82c has a function as a ⅛ wavelength plate, in which the bold arrow indicates the crystal orientation. That is, there occurs a phase difference of π/4 between two polarization components for orthogonal polarized beams transmitted through the photonic crystal 82c among the rectangular orthogonal polarized beams 81, as shown in FIG. 9. On the other hand, there is no phase difference between two polarization components for the orthogonal polarized beams transmitted through the synthetic quartz 82d.

A phase-shifting element 83 is divided into four, in which a synthetic quartz 83d, a photonic crystal 83c, a synthetic quartz 83d and a photonic crystal 83c are arranged from the left, as shown in FIG. 10. The photonic crystal 83c, like the phase-shifting element 82, has a function as the quarter wavelength plate, in which the bold arrow indicates the crystal orientation, That is, there occurs a phase difference of π/2 between two polarization components for orthogonal polarized beams transmitted through the photonic crystal 83c among the rectangular orthogonal polarized beams 81, as shown in FIG. 9. On the other hand, there is no phase difference between two polarization components for the orthogonal polarized beams transmitted through the synthetic quartz 83d.

A phase-shifting element 84 is divided into eight, in which a photonic crystal 84a having a crystal orientation of 45° and a photonic crystal 84b having a reverse crystal orientation of 45° are alternately arranged, as shown in FIG. 10. The photonic crystals 84a and 84b have the function as the polarizing element, in which the bold arrow indicates the crystal orientation. That is, both the polarization components interfere with a phase shift of π relatively given between two polarization components making up the orthogonal polarized beams transmitted through the photonic crystal 84a and two polarization components making up the orthogonal polarized beams transmitted through the photonic crystal 84b among the rectangular orthogonal polarized beams 81, as shown in FIG. 9.

That is, the eight phase-shifting interference lights 85 are generated by causing polarization interference with a phase shift of 0, π/4, π/2, 3π/4, π, 5π/4, 3π/2 and 7π/4 given between the orthogonal polarization components of the rectangular orthogonal polarized beams 81 transmitted through the phase-shifting elements 82, 83 and 84. The eight phase-shifting interference lights 85 are transmitted through an interference filter 86 having a transmission center wavelength at a wavelength of 632.8 nm to avoid influence of the disturbance light, received by a split type photoelectric conversion element 87 such as an eight division photodiode array composed of the eight photoreceptive areas corresponding to the eight areas of the phase-shifting element 84, amplified by an amplifier 88, and outputted as the eight phase-shifting interference signals 89a, 89b, 89c, 89d, 89e, 89f, 89g and 89h. FIG. 11 shows a photoreceptive plane of the split type photoelectric conversion element 87. The photoreceptive areas 87a and 87b correspond to the photonic crystals 84a and 84b of the phase-shifting element 84 of FIG. 10.

The eight phase shift interference signals 89*a*, 89*b*, 89*c*, 89*d*, 89*e*, 89*f*, 89*g* and 89*h* are given by (expression 6) to (expression 13).

$$I_a = I_m + I_r + 2(I_m \cdot I_r)^{1/2} \cos(8\pi nD/\lambda) \quad \text{(expression 6)}$$

$$I_b = I_m + I_r + 2(I_m \cdot I_r)^{1/2} \cos(8\pi nD/\lambda + \pi) = I_m + I_r - 2(I_m \cdot I_r)^{1/2} \cos(8\pi nD/\lambda) \quad \text{(expression 7)}$$

$$I_c = I_m + I_r + 2(I_m \cdot I_r)^{1/2} \cos(8\pi nD/\lambda + \pi/2) = I_m + I_r - 2(I_m \cdot I_r)^{1/2} \sin(8\pi nD/\lambda) \quad \text{(expression 8)}$$

$$I_d = I_m + I_r + 2(I_m \cdot I_r)^{1/2} \cos(8\pi nD/\lambda + 3\pi/2) = I_m + I_r - 2(I_m \cdot I_r)^{1/2} \sin(8\pi nD/\lambda) \quad \text{(expression 9)}$$

$$I_e = I_m + I_r + 2(I_m \cdot I_r)^{1/2} \cos(8\pi nD/\lambda + \pi/4) = I_m + I_r + (2I_m \cdot I_r)^{1/2} \{\cos(8\pi nD/\lambda) - \sin(8\pi nD/\lambda)\} \quad \text{(expression 10)}$$

$$I_f = I_m + I_r + 2(I_m \cdot I_r)^{1/2} \cos(8\pi nD/\lambda + 5\pi/4) = I_m + I_r - (2I_m \cdot I_r)^{1/2} \{\cos(8\pi nD/\lambda) - \sin(8\pi nD/\lambda)\} \quad \text{(expression 11)}$$

$$I_g = I_m + I_r + 2(I_m \cdot I_r)^{1/2} \cos(8\pi nD/\lambda + 3\pi/4) = I_m + I_r + (2I_m \cdot I_r)^{1/2} \{\sin(8\pi nD/\lambda) + \cos(8\pi nD/\lambda)\} \quad \text{(expression 12)}$$

$$I_h = I_m + I_r + 2(I_m \cdot I_r)^{1/2} \cos(8\pi nD/\lambda + 7\pi/4) = I_m + I_r - (2I_m \cdot I_r)^{1/2} \{\sin(8\pi nD/\lambda) + \cos(8\pi nD/\lambda)\} \quad \text{(expression 13)}$$

The displacement computation processing unit 51 computes the movement amount D of the measurement object 31 based on (expression 14), in which the movement amount D is displayed as a movement amount signal 61 on a displacement output unit 70.

$$D = (\lambda/8\pi n)\tan^{-1}[\{2^{1/2}(I_g - I_h) - (I_a - I_b)\}/\{2^{1/2}(I_e - I_f) + (I_c - I_d)\}] \quad \text{(expression 14)}$$

Though the wire-grid polarizing element (Wire Grid Polarizer) is used as the reference mirror 9 in this embodiment, it will be apparent that the photonic crystal 9*c* having the crystal orientation in the horizontal direction may be used in the same way as in the first embodiment, as shown in FIG. 4. Likewise, the photonic crystal 10*c* having the crystal orientation in the 45° direction may be used for the quarter wavelength plate 10.

As will be clear from FIG. 9, two beams of the measuring beam 6*m* going toward the target mirror 12 and the reference beam 6*r* are emitted from the light source unit and enter the sensor unit 100 to pass through exactly the same optical path up to the reference mirror 9, and further from the reference mirror 9 to the four photoelectric conversion elements 22 where they are received. That is, the interferometer is of a common optical path type. Accordingly, if a temperature distribution, a refractive index distribution or a mechanical vibration occurs due to fluctuation of the air on the optical path, these disturbances have the same influence on both beams, whereby when both beams interfere, the influences of the disturbances are completely offset, so that the interference light is not affected by the disturbance. Though the measuring beams 6*m* only exists on the optical path between the reference mirror 9 and the target mirror 12, a gap between the reference mirror 9 and the target mirror 12 can be set to 1 mm or less, because the stroke of a scanning probe microscope is at most about several hundreds of microns, for example, whereby the influence of the disturbance in such minute gap can be ignored. Also, the intensity variation of the laser beam itself brings about variations in the probe light detection intensity $I_m$ and the reference light detection intensity $I_r$ in (expression 6) to (expression 13), although they are offset through a subtraction process and a division process in (expression 5) in the displacement computation processing unit 50.

Further, the light interference displacement sensor of this embodiment has a simple constitution of generating the eight orthogonal polarized beams and generating and receiving the eight phase-shifting interference lights spatially in parallel through the phase-shifting elements arranged like an array, whereby there is a merit that the number of optical components is significantly smaller and the displacement sensor has a much smaller size than the conventional phase-shifting interferometer. Specifically, the size of the interferometer 600 can be reduced to about 20×15×50 mm or less. Also, since the eight phase shift interference lights pass through the proximate optical paths, even if there is a disturbance such as a temperature distribution, a humidity distribution, an air pressure distribution, a density distribution or an air flow distribution on the optical path, the influence can be suppressed to the minimum. Further, in this embodiment, since the phase-shifting amount is π/4 or one-half of the first embodiment, the movement amount D can be calculated at higher precision.

Also, the measurement precision can be further improved by increasing the number of division in the phase-shifting elements 82, 83 and 84, and the number of division in the split type photoelectric conversion element 87.

From the above, with the light interference displacement sensor of this embodiment, the movement amount or position of the measurement object can be measured stably at a precision from sub nanometer to pico-meter or less without controlling the environmental factors such as temperature, humidity, air pressure, density and acoustic vibration at high precision. Also, the light interference displacement sensor of this embodiment may be mounted on the AFM of FIG. 5 in the same way as the second embodiment, whereby the same effects of the second embodiment can be obtained, and the position of the probe can be measured stably at a precision from sub nanometer to pico-meter or less. As a result, the resolution of the two-dimensional AFM image can be increased and the image reproducibility can be greatly improved.

Also, if the light interference displacement sensor of this embodiment is mounted on the surface roughness defect inspection device as shown in FIG. 8, in the same way as in the third embodiment, the same effects of the third embodiment can be obtained. The roughness defect on the surface of the specimen can be measured stably at a sensitivity from sub nanometer to pico-meter or less. As a result, the sensitivity of the roughness defect inspection on a semiconductor wafer, magnetic disk or magnetic head air-bearing surface, for example, can be greatly improved.

Embodiment 5

Figure 12:
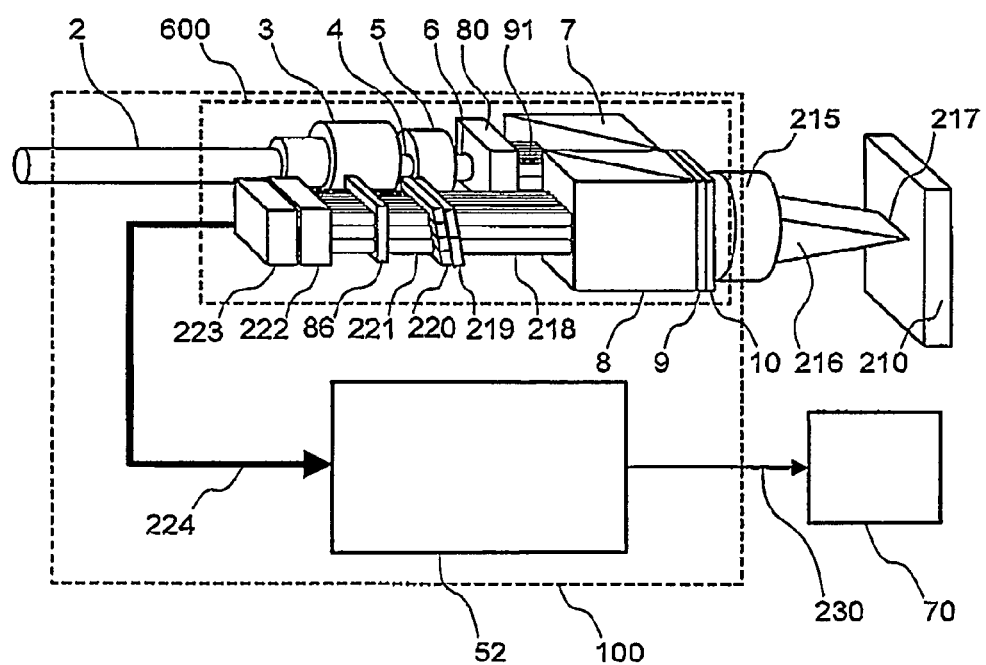
FIG. 12 is a perspective view and a block diagram showing the constitution of a light interference displacement sensor according to an embodiment 5.
Figure 13:
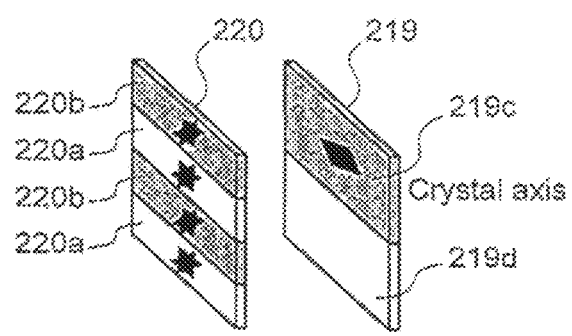
FIG. 13 is a perspective view showing the constitution of a phase-shifting element using the photonic crystal according to the embodiment 5.
Figure 14:
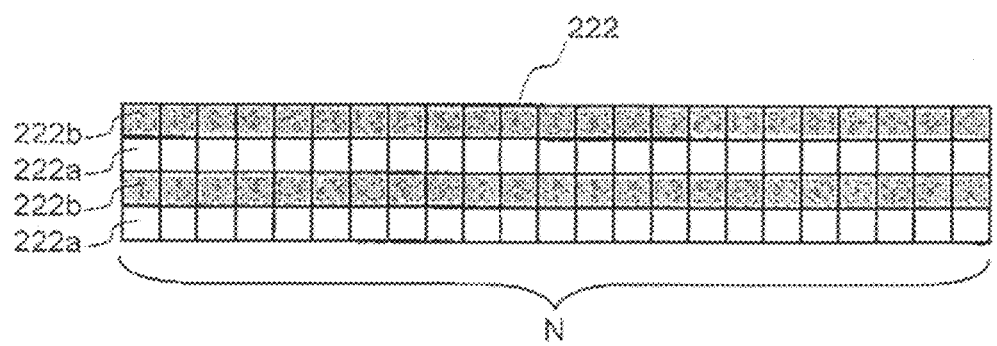
FIG. 14 is a front view showing a photoreceptive plane of a split type photoelectric conversion element according to the embodiment 5.

Referring to FIGS. 12 to 14, a fifth embodiment of the invention will be described below. As shown in FIG. 12, a light interference displacement sensor of this embodiment comprises a light source unit, not shown, a sensor unit 100 and a displacement output unit 70.

In the light source unit, a laser beam of linearly polarized light having a wavelength of 632.8 nm from a frequency stabilized He—Ne laser, for example, is conducted to the sensor unit 100 in a polarization direction of 45° by a polarization maintaining fiber 2.

The sensor unit 100 comprises an interferometer 600 and a displacement computation processing unit 52. In the interferometer 600, a polarized light of 45° outgoing from the polarization maintaining fiber 2 is converted into the parallel light 4 by a collimator 3, and transmitted through a polarizing element 5 such as Glan-Thompson prism, and the transmitted light 6 is converted into a rectangular beam 91 by a beam shaping element 80 such as a diffraction optical element, a hologram element or an anamorphic prism pair in the same way as in the first embodiment. The rectangular beam 91 is reflected from a prism mirror 7 and a non-polarizing beam splitter 8 to be incident on a reference mirror 9.

The reference mirror 9 is formed with a grating 9*b* of metal material such as Al or the like on a synthetic quartz substrate 9*a*, as shown in FIG. 2. The rectangular polarized beam 6 incidents on this grating in a direction of 45° is composed of two orthogonal polarization components decomposed into vectors, in which an S polarization component 25*s* parallel to the longitudinal direction of the grating is reflected from the grating, and an orthogonal P polarization component 25*p* is transmitted through the grating. That is, this grating has the properties as a so-called wire-grid polarizing element (Wire Grid Polarizer). In this embodiment, the pitch of the grating 9*b* is 144 nm, the line width is 65 nm, and the height is 165 nm.

A rectangular S polarized beam 6*r* reflected from the reference mirror 9 is used as a reference beam. The transmitted rectangular P polarized beam 6*m* is used as a measuring beam. The rectangular P polarized beam 6*m* is transmitted through a quarter wavelength plate 10 to become the circularly polarized light, and linearly converged (216) on the surface of a specimen 210 by a converging lens 215. If the NA (Numerical Aperture) of the converging lens 215 is 0.8, the spot width (in the direction orthogonal to the longitudinal direction) of a linearly converged spot 217 is about 0.8 µm. The reflected light from the surface of the specimen 210 is transmitted through the converging lens 215 to become the rectangular beam, transmitted through the quarter wavelength plate 10 again to become the S polarized light, reflected from the reference mirror 9, transmitted through the quarter wavelength plate 10, and linearly converged (216) as the circularly polarized light on the surface of the specimen 210 by the converging lens 215 again.

The reflected light from the surface of the specimen 210 is transmitted through the converging lens 215 to become the rectangular beam, transmitted through the quarter wavelength plate 10 to become the P polarized light, and transmitted through the reference mirror 9. That is, the measuring beam 6*m* reciprocates twice on an optical path between the reference mirror 9 and the surface of the specimen 210, whereby double the roughness amount of the surface of the specimen 210 is detected. The rectangular S polarized beam 6*r* reflected from the reference mirror 9 and the rectangular P polarized beam 6*m* transmitted through the reference mirror are synthesized as a rectangular orthogonal polarized beam 218, and transmitted through the non-polarizing beam splitter 8. The longitudinal direction of the linearly converged spot 217 and the longitudinal direction of the rectangular orthogonal polarized beams 218 are in conjugate relation. That is, the rectangular P polarized beam 6*m* conserves roughness distribution information on the surface of the specimen 210 in this direction as a light phase distribution.

This rectangular orthogonal polarized beams 218 are transmitted through the phase-shifting elements 219 and 220 to make polarization interference with a phase shift of 0, $\pi/2$, $\pi$ and $3\pi/2$ given between the orthogonal polarization components and generate the four phase-shifting interference lights 221 divided in the direction orthogonal to the longitudinal direction of the linearly converged spot 217.

A phase shift element 219 is divided into two in the direction orthogonal to the longitudinal direction of the linearly converged spot 217, in which the lower half is composed of a synthetic quartz 219*d* and the upper half is composed of a photonic crystal 219*c*, as shown in FIG. 13. The constitution and principle of the photonic crystal 219*c* are the same as in the first embodiment, and the explanation is omitted. The photonic crystal 219*c* has a function as the quarter wavelength plate, in which the bold arrow indicates the crystal orientation. That is, there occurs a phase difference of $\pi/2$ between two polarization components for orthogonal polarized beams transmitted through the photonic crystal 219*c* among the rectangular orthogonal polarized beams 218, as shown in FIG. 12. On the other hand, there is no phase difference between two polarization components for the orthogonal polarized beams transmitted through the synthetic quartz 219*d*.

A phase shift element 220 is divided into four in the direction orthogonal to the longitudinal direction of the linearly converged spot 217, in which a photonic crystal 220*a* having a crystal orientation of 45° and a photonic crystal 220*b* having a reverse crystal orientation of 45° are alternately arranged, as shown in FIG. 13. The photonic crystals 220*a* and 220*b* have a function as the polarizing element, in which the bold arrow indicates the crystal orientation. That is, both the polarization components interfere with a phase shift of $\pi$ relatively given between two polarization components making up the orthogonal polarized beams transmitted through the photonic crystal 220*a* and two polarization components making up the orthogonal polarized beams transmitted through the photonic crystal 220*b* among the rectangular orthogonal polarized beams 218, as shown in FIG. 12.

That is, polarization interference is caused with a phase shift of 0, $\pi/2$, $\pi$ and $3\pi/2$ given between the orthogonal polarization components in the direction orthogonal to the longitudinal direction of the rectangular orthogonal polarized beams 218 transmitted through the phase-shifting elements 219 and 220, generating the phase-shifting interference lights 221 divided into four in the direction orthogonal to the longitudinal direction of the linearly converged spot 217, and conjugate with the longitudinal direction of the linearly converged spot 217. The phase-shifting interference lights 221 are transmitted through an interference filter 86 having a transmission center wavelength at a wavelength of 632.8 nm to avoid influence of the disturbance light, received by a split type photoelectric conversion element 222 such as a photodiode array composed of N pixels×4 photoreceptive areas corresponding to four areas of the phase shift element 220 in the longitudinal direction of the linearly converged spot 217, amplified by an amplifier 223, and outputted as N×4 phase shift interference signals 224, as shown in FIG. 14.

The photoreceptive areas 222*a* and 222*b* correspond to the photonic crystals 220*a* and 220*b* of the phase-shifting element 220 of FIG. 13, as shown in FIG. 14. The four phase shift interference signals corresponding to N pixels are given by (expression 1) to (expression 4) in the same way as the first embodiment. The displacement computation processing unit 52 computes a one-dimensional distribution of the surface roughness amount D of the specimen 210 for each of N pixels based on (expression 5), which is outputted as a surface roughness signal 230 to the displacement output unit 70.

Though the wire-grid polarizing element (Wire Grid Polarizer) is used as the reference mirror 9 in this embodiment, it will be apparent that the photonic crystal 9*c* having the crystal orientation in the horizontal direction may be used in the same way as the first embodiment, as shown in FIG. 4. Likewise, the photonic crystal 10*c* having the crystal orientation in the 45° direction may be used for the quarter wavelength plate 10. Also, the phase shift amount may be increased by every $\pi/8$ in combination with the fourth embodiment. In this case, the split type photoelectric conversion element 222 may be a two-dimensional solid-state image pickup device.

As will be clear from FIG. 12, two beams of the measuring beam 6*m* going toward the surface of the specimen 210 and the reference beam 6*r* are emitted from the light source unit and enter the sensor unit 100 to pass through exactly the same optical path up to the reference mirror 9, and further from the reference mirror 9 to the photoelectric conversion elements 222 where they are received. That is, the interferometer is of a common optical path type. Accordingly, if a temperature distribution, a refractive index distribution or a mechanical vibration occurs due to fluctuation of the air on the optical path, these disturbances have the same influence on both beams, whereby when both beams interfere, the influences of the disturbances are completely offset, so that the interference light is not affected by the disturbance. Also, the strength variation of the laser beam itself has the same influence on the measuring beam 6m and the reference beam 6r to be offset by interference, and is equally overlaid on the eight phase shift interference lights measured to be offset through a subtraction process of (expression 5) in the displacement computation processing unit 52.

Further, the light interference displacement sensor of this embodiment has a simple constitution of generating the four orthogonal polarized beams and generating and receiving the four phase shift interference lights spatially in parallel by the phase-shifting elements arranged like an array, whereby there is a merit that the number of optical components is significantly smaller and the displacement sensor has a much smaller size than the conventional phase-shifting interferometer. Also, since the four phase-shifting interference lights pass through the proximate optical paths, even if there is a disturbance such as a temperature distribution, a humidity distribution, an air pressure distribution, a density distribution or an air flowing distribution due to fluctuation of the air on the optical path, the influence can be suppressed to the minimum.

From the above, with the light interference displacement sensor of this embodiment, the movement amount or position of the measurement object can be measured stably at a precision from sub nanometer to pico-meter or less without controlling the environmental factors such as temperature, humidity, air pressure, density and acoustic vibration at high precision. Also, the displacement output unit 70 is removed from the light interference displacement sensor of this embodiment and the light interference displacement sensor is mounted on the surface roughness defect inspection device of FIG. 8 in the same way as the third embodiment, whereby the same effects of the third embodiment can be obtained, and the roughness defect on the surface of the specimen can be measured stably at a sensitivity from sub nanometer to pico-meter or less. As a result, the sensitivity of the roughness defect inspection on a semiconductor wafer, magnetic disk or magnetic head air-bearing surface, for example, can be greatly improved. Particularly, in this embodiment, there is an advantage that the roughness distribution information in the two-dimensional area can be obtained in a short time by scanning in only one direction of X or Y, using the linearly converged spot 217.

As described above, with the invention, it is possible to calculate the displacement amount or movement amount of an object at high precision without influence of the disturbance, using a very small light interference displacement sensor, whereby the application objects are greatly expanded. As a result, there is an effect that the probe scanning by the scanning probe microscope, most notably the AFM, can be made at a precision of sub nanometer or less, and the optical information or microscopic roughness information of the fine solid structure element, most notably the semiconductor device, can be measured at a resolution of sub nanometer or less and with high reproducibility. Also, there is an effect that the microscopic roughness distribution or microscopic roughness defect of sub nanometer or less on a semiconductor wafer, magnetic disk or magnetic head air-bearing surface can be inspected. Further, these measurement results are fed back to the element manufacturing process conditions, whereby the reliable devices or media can be produced at higher yield.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A method for measuring the surface of a specimen, including the steps of:
    positioning a measuring area of said specimen under a probe, the probe being affixed to an actuator;
    positioning the probe to be in contact with the specimen;
    increasing a contact force between the probe and the specimen, until the contact force is detected as reaching a predetermined set contact force;
    separating a light beam from a light source into a first light beam and a second light beam;
    irradiating said first light beam onto a target mirror attached on said actuator, thereby generating a light beam reflected from said target mirror attached on said actuator;
    synthesizing said second light beam with said light beam reflected from said actuator;
    dividing the synthesized light beam into a plurality of light beams;
    phase shifting at least one of the plurality of light beams, by use of a plurality of phase shift elements, thereby producing interfered light beams, wherein the plurality of phase shift elements include: a first phase shift element divided into an upper part and a lower part having different crystal orientations respectively, and a second phase shift element divided into a left part and a right part having different crystal orientations respectively; and
    detecting the movement amount of said actuator based on said interfered light beams.

2. The method for measuring the surface of the specimen according to claim 1, wherein said separating step includes using a polarizing element subsequent to separating said light beam from said light source into said first light and said second light.

3. The method for measuring the surface of the specimen according to claim 2, wherein said polarizing element includes a photonic crystal.

4. The method for measuring the surface of the specimen according to claim 1, wherein said separating step includes separating the light beam from said light source into the first light and the second light by using a wire-grid polarizing element.

5. The method for measuring the surface of the specimen according to claim 1, wherein said separating step includes separating the light beam from said light source into the first light and the second light by using a photonic crystal.

6. An apparatus for measuring the surface of a specimen, comprising:
    a light source;
    a probe affixed to an actuator;
    a reference mirror configured to separate a light beam from said light source into a first light beam and a second light beam, with the first light beam to be irradiated onto a target mirror attached to said actuator, and to synthesize said second light beam with said first light beam as reflected from the target mirror attached to said actuator, thereby producing a synthesized light beam;

an optical element configured to divide the synthesized light beam into a plurality of light beams;

a plurality of phase shift elements configured to phase shift at least one of the plurality of light beams, and thereby produce a plurality of interfered light beams, wherein the plurality of phase shift elements include: a first phase shift element divided into an upper part and a lower part having different crystal orientations respectively, and a second phase shift element divided into a left part and a right part having different crystal orientations respectively;

a movement amount detector, including a photoelectric conversion element and a displacement computation processing unit configured to detect a movement amount of said actuator along each axis, based on the interfered light beams of said first light beam and said second light beam;

an XYZ stage configured to move, with the specimen laid thereon, in the three dimensional directions of X, Y and Z, and thereby configured to position the measuring area of said specimen under said probe; and a four division position sensor configured to detect contact force.

7. The apparatus for measuring the surface of the specimen according to claim 6, wherein said phase shift element includes a polarizing element.

8. The apparatus for measuring the surface of the specimen according to claim 7, wherein said polarizing element includes a photonic crystal.

9. The apparatus for measuring the surface of the specimen according to claim 6, wherein said reference mirror includes at least one of a wire-grid polarizing element and a photonic crystal.

10. The apparatus for measuring the surface of the specimen according to claim 9, wherein said reference mirror includes a photonic crystal.

11. The apparatus for measuring the surface of the specimen according to claim 9, wherein said reference mirror includes a wire-grid polarizing element.

12. The method for measuring the surface of the specimen according to claim 1,
wherein separating light beams from a light source into first light beams and second light beams is performed by a plurality of light interference displacement sensors, wherein each of an X-axis, a Y-axis, and a Z-axis has a light interference displacement sensor disposed thereupon, with the X-axis, a Y-axis, and Z-axis being orthogonal to one another;

wherein irradiating said first light beam onto said actuator, thereby generating a light beam reflected from said actuator, is performed to said light interference displacement sensors disposed along each of the X-axis, the Y-axis, and the Z-axis;

wherein synthesizing said second light beam with said light beam reflected from said actuator, thereby producing an interfered light beam on a single plane, is performed by said light interference displacement sensors disposed along each of the X-axis, the Y-axis, and the Z-axis.

13. The apparatus for measuring the surface of the specimen according to claim 6, further comprising:
a plurality of light interference displacement sensors, with a plurality of light interference displacement sensors, wherein each of an X-axis, a Y-axis, and a Z-axis has a light interference displacement sensor disposed thereupon, with the X-axis, a Y-axis, and Z-axis being orthogonal to one another, each light interference displacement sensor having a reference mirror, and configured to separate a light beam from said light source into a first light beam and a second light beam, with said first light beam to be irradiated to said actuator, and to synthesize said second light beam with said first light beam as reflected from said actuator.

14. The method for measuring the surface of the specimen according to claim 1,
wherein the first phase shift element is divided into an upper part composed of a laminated photonic crystal having a horizontal crystal orientation, and a lower part composed of a synthetic quartz; and wherein the second phase shift element is divided into a left part composed of a laminated photonic crystal having a crystal orientation of +45° from horizontal, and a right part composed of a laminated photonic crystal having a crystal orientation of −45° from horizontal.

15. The apparatus for measuring the surface of the specimen according to claim 6, further comprising:
wherein the first phase shift element is divided into an upper part composed of a laminated photonic crystal having a horizontal crystal orientation, and a lower part composed of a synthetic quartz; and wherein the second phase shift element is divided into a left part composed of a laminated photonic crystal having a crystal orientation of +45° from horizontal, and a right part composed of a laminated photonic crystal having a crystal orientation of −45° from horizontal.

16. A method for measuring the displacement of a specimen, including the steps of:
separating a light beam from a light source into a first light beam and a second light beam;

irradiating said first light beam onto a movable object, thereby generating a light beam reflected from said moveable object;

synthesizing said second light beam with said light beam reflected from said moveable object, thereby producing a synthesized light beam;

dividing said synthesized light beam into a plurality of light beams that are all spatially in parallel with one another;

on each of one or more parallel planes, simultaneously phase shifting a plurality of light beams, thereby generating a plurality of phase shift interference light beams; and detecting the movement amount of said moveable object based on said plurality of phase shift interference light beams;

wherein said dividing step is performed by transmitting said synthesized light beam sequentially through two opposed quadrangular pyramid prisms, each quadrangular pyramid prism having a pyramidal shape.

17. The method for measuring the displacement of the specimen according to claim 16, wherein all light beams generated by said dividing step are spatially in parallel with one another, but not in a single plane.

18. The method for measuring the displacement of the specimen according to claim 16, wherein said dividing step includes:

dividing said synthesized beam such that beams divided from said synthesized beam are neither perpendicular nor parallel to said synthesized beam, and then redirecting said beams divided from said synthesized beam to be parallel to said synthesized beam.

19. The method for measuring the displacement of the specimen according to claim 16, wherein the step of simultaneously phase shifting a plurality of light beams is performed by using a plurality of phase shift elements that include: a first phase shift element divided into an upper part and a lower part having different crystal orientations respectively, and a second phase shift element divided into a left part and a right part having different crystal orientations respectively.

20. The method for measuring the displacement of the specimen according to claim 19, wherein the first phase shift element is divided into an upper part composed of a laminated photonic crystal having a horizontal crystal orientation, and a lower part composed of a synthetic quartz; and wherein the second phase shift element is divided into a left part composed of a laminated photonic crystal having a crystal orientation of +45° from horizontal, and a right part composed of a laminated photonic crystal having a crystal orientation of −45° from horizontal.

21. An apparatus for measuring the displacement of a specimen, comprising:

a light source;

a reference mirror, that upon receiving a light beam from said light source separates said light beam from said light source into a first light beam and a second light beam, irradiates said first light beam onto a movable object, thereby generating a light beam reflected from said moveable object, and synthesizes said second light beam with said light beam reflected from said moveable object, thereby producing a synthesized light beam;

a beam divider, that upon receiving said synthesized light beam from said reference mirror divides said synthesized light beam into a plurality of light beams that are all spatially in parallel with one another;

a plurality of phase shift elements disposed in parallel planes, wherein upon receiving said plurality of light beams, phase shift elements on a same plane simultaneously phase shift said plurality of light beams, thereby generating a plurality of phase shift interference light beams; and a movement amount detector, including a photoelectric conversion element and a displacement computation processing unit, that upon receiving said plurality of phase shift interference light beams detects a movement amount of said moveable object;

wherein the beam divider includes two opposed quadrangular pyramid prisms, each quadrangular pyramid prism having a pyramidal shape.

22. The apparatus for measuring the displacement of the specimen according to claim 21, wherein all light beams output from said beam divider are spatially in parallel with one another, but not in a single plane.

23. The apparatus for measuring the displacement of the specimen according to claim 21, wherein said beam divider is configured to divide said synthesized beam such that beams divided from said synthesized beam are neither perpendicular nor parallel to said synthesized beam, and then to redirect said beams divided from said synthesized beam to be parallel to said synthesized beam.

24. The apparatus for measuring the displacement of the specimen according to claim 21, wherein said reference mirror includes at least one of a wire-grid polarizing element and a photonic crystal.

25. The apparatus for measuring the displacement of the specimen according to claim 24, wherein said reference mirror includes a wire-grid polarizing element.

26. The apparatus for measuring the displacement of the specimen according to claim 24, wherein said reference mirror includes a photonic crystal.

27. The apparatus for measuring the displacement of the specimen according to claim 21, wherein the plurality of phase shift elements include: a first phase shift element divided into an upper part and a lower part having different crystal orientations respectively, and a second phase shift element divided into a left part and a right part having different crystal orientations respectively.

28. The apparatus for measuring the displacement of the specimen according to claim 27, wherein the first phase shift element is divided into an upper part composed of a laminated photonic crystal having a horizontal crystal orientation, and a lower part composed of a synthetic quartz; and wherein the second phase shift element is divided into a left part composed of a laminated photonic crystal having a crystal orientation of +45° from horizontal, and a right part composed of a laminated photonic crystal having a crystal orientation of −45° from horizontal.

* * * * *